United States Patent
Song et al.

(10) Patent No.: US 11,413,766 B2
(45) Date of Patent: Aug. 16, 2022

(54) ROBOT CLEANER

(71) Applicant: LG ELECTRONICS INC., Seoul (KR)

(72) Inventors: Seunghyun Song, Seoul (KR); Bohyun Nam, Seoul (KR); Hwang Kim, Seoul (KR); Sungil Park, Seoul (KR); Myungwhoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 483 days.

(21) Appl. No.: 16/484,352

(22) PCT Filed: Jan. 19, 2018

(86) PCT No.: PCT/KR2018/000896
§ 371 (c)(1),
(2) Date: Aug. 7, 2019

(87) PCT Pub. No.: WO2018/151424
PCT Pub. Date: Aug. 23, 2018

(65) Prior Publication Data
US 2020/0001468 A1 Jan. 2, 2020

(30) Foreign Application Priority Data
Feb. 17, 2017 (KR) .................. 10-2017-0021839

(51) Int. Cl.
*B25J 11/00* (2006.01)
*A47L 9/24* (2006.01)
(Continued)

(52) U.S. Cl.
CPC ........... *B25J 11/0085* (2013.01); *A47L 9/244* (2013.01); *A47L 9/248* (2013.01); *A47L 9/2842* (2013.01);
(Continued)

(58) Field of Classification Search
CPC ...... A47L 2201/00; A47L 9/244; A47L 9/248; A47L 9/2842; B25J 11/0085; B25J 5/007; B25J 9/0003; F16L 27/12
See application file for complete search history.

(56) References Cited

U.S. PATENT DOCUMENTS

2001/0004719 A1   6/2001  Sommer
2015/0208891 A1   7/2015  Jang et al.
2016/0150931 A1   6/2016  Kim et al.

FOREIGN PATENT DOCUMENTS

CN   202122548   1/2012
CN   105263382   1/2016
(Continued)

OTHER PUBLICATIONS

Chinese Office Action dated Sep. 17, 2020 issued in CN Application No. 201880010862.9.
(Continued)

*Primary Examiner* — Andrew A Horton
(74) *Attorney, Agent, or Firm* — Ked & Associates, LLP

(57) ABSTRACT

Disclosed is a robot cleaner comprising: a cleaner main body to which a dust collecting device is mounted; a cleaning module which is configured to be movable relative to the cleaner main body and performs the function of cleaning a floor; a connection unit which is connected to each of the cleaner main body and the cleaning module and is configured to have a variable length; and a driving unit configured to change the length of the connection unit.

15 Claims, 9 Drawing Sheets

(51) Int. Cl.
*A47L 9/28* (2006.01)
*B25J 5/00* (2006.01)
*B25J 9/00* (2006.01)
*F16L 27/12* (2006.01)

(52) U.S. Cl.
CPC ............ *B25J 5/007* (2013.01); *B25J 9/0003* (2013.01); *F16L 27/12* (2013.01); *A47L 2201/00* (2013.01)

(56) References Cited

FOREIGN PATENT DOCUMENTS

| | | |
|---|---|---|
| CN | 105534008 | 5/2016 |
| CN | 205338071 | 6/2016 |
| EP | 1 806 086 | 7/2007 |
| JP | H 08-098794 | 4/1996 |
| JP | H 11-206655 | 8/1999 |
| KR | 20-1999-0004062 | 1/1999 |
| KR | 10-2002-0091977 | 12/2002 |
| KR | 10-2003-0085804 | 11/2003 |
| KR | 10-2003-0086035 | 11/2003 |
| KR | 20-2010-002761 | 3/2010 |
| KR | 10-2014-0070250 | 6/2014 |
| KR | 10-2015-0081767 | 7/2015 |
| KR | 10-2016-0065683 | 6/2016 |
| WO | WO 2016/195266 | 12/2016 |

OTHER PUBLICATIONS

Chinese Office Action dated May 25, 2021 issued in CN Application No. 201880010862.9.
Australian Office Action dated May 13, 2020 issued in AU Application No. 2018222574.
International Search Report (with English Translation) and Written Opinion dated May 15, 2018 issued in Application No. PCT/KR2018/000896.
Korean Office Action dated Mar. 21, 2018 issued in KR Application No. 10-2017-0021839.
Korean Office Action dated Sep. 21, 2018 issued in KR Application No. 10-2017-0021839.
Korean Notice of Allowance dated Jan. 31, 2019 issued in KR Application No. 10-2017-0021839.

ROBOT CLEANER

CROSS-REFERENCE TO RELATED PATENT APPLICATIONS

This application is a U.S. National Stage Application under 35 U.S.C. § 371 of PCT Application No. PCT/KR2018/000896, filed Jan. 19, 2018, which claims priority to Korean Patent Application No. 10-2017-0021839, filed Feb. 17, 2017, whose entire disclosures are hereby incorporated by reference.

TECHNICAL FIELD

The present disclosure relates to a robot cleaner in which a cleaning module is relatively movable with respect to a cleaner main body.

BACKGROUND ART

In general, robots have been developed for industrial use and have been part of factory automation. In recent years, the field of applications of robots has been expanded, and home robots that can be used in ordinary homes as well as aerospace robots and medical robots have been made.

A representative example of a home robot may be a robot cleaner. The robot cleaner carries out a function of cleaning a floor while traveling on a predetermined area by itself. To do this, the robot cleaner includes a cleaner main body including a driving wheel for autonomous traveling, and a cleaning module for sucking dirt and foreign substances from a floor or mopping a floor.

In general, since the cleaning module is mounted on the cleaner body and located at a fixed position, a cleaning area of the cleaning module may be limited by a shape of the cleaner main body.

As an example, when a suction portion is provided on a lower surface of the robot cleaner having a cylindrical shape, there is such a limit that it is difficult to clean portions of the cleaning area. To resolve this, the Korean Patent Publication No. 10-2015-0081767 (disclosed on Jul. 15, 2015) discloses such a robot cleaner that a suction portion may move from left to right. Accordingly, the suction portion may move toward the corner portions to clean the corner areas.

As another example, when a cleaner main body is provided with a dust collecting device with large volume, the cleaner main body may have a height greater than that of a cleaning module. Since the cleaner main body cannot enter an area with a height less than that of the cleaner main body (e.g., below a sofa, a bed, a table, etc.), even when the cleaner module has a height enough to enter the area, there is such a limit that cleaning may not be performed in the area.

DISCLOSURE

Technical Problem

An aspect of the present disclosure is to provide a robot cleaner capable of cleaning an area with a height less than that of a cleaner main body, e.g., below a sofa, a bed, a table, etc.

Technical Solution

To achieve these and other advantages and in accordance with the purpose of the present disclosure, as embodied and broadly described herein, there is provided a robot cleaner including: a cleaner main body equipped with a dust collecting device; a cleaning module that is relatively movable with respect to the cleaner main body and cleans a floor; a connection unit that is connected to the cleaner main body and the cleaning module respectively and has a variable length; a driving unit that changes a length of the connection unit.

According to one embodiment of the present disclosure, the robot cleaner may include: a cleaner main body equipped with a dust collecting device; a cleaning module that is relatively movable with respect to the cleaner main body and sucks air containing dust and foreign substances; and a connection unit that is connected to the cleaner main body and the cleaning module respectively and has a variable length, wherein the connection unit forms a part of an intake flow path that guides the air sucked by the cleaning module to the dust collecting device.

The cleaning module may be relatively movable with respect to the cleaner main body between a first state when a part of the cleaning module overlaps the cleaner main body and a second state when the cleaning module protrudes towards a front of the cleaner main body.

The connection unit may include: an outer case mounted on the cleaner main body; an inner case that is inserted into the outer case and relatively movable with respect to the outer case; and a flexible tube which is fixed to the outer case and the inner case respectively, and of which at least a part is provided to extend or contract according to the relative movement of the inner case.

The flexible tube may include a corrugated portion including a ductile material and provided to extend or contract according to the relative movement of the inner case.

The connection unit may further include a flow path connector that is connected to the cleaning module and the inner case respectively, and supplies the air sucked by the cleaning module to the inner case.

One end portion of the flexible tube may be connected to the inner case and the flow path connector.

A guide groove may be provided to extend along a longitudinal direction in the outer case, and a guide rail may be provided to protrude from the inner case, the guide rail being inserted into the guide groove and guiding the relative movement of the inner case with respect to the outer case.

The robot cleaner may further include a driving unit that relatively moves the inner case with respect to the outer case.

The driving unit may include: a driving motor including a worm mounted on a rotating shaft; a double gear in which a worm wheel engaged with the worm is combined with a pinion; and a rack gear provided on the guide rail extending along a longitudinal direction of the inner case and engaged with the pinion.

A driving motor mounting portion that fixes the driving motor and the double gear may be provided on an end portion of the outer case.

A hole connecting with inside of the outer case may be provided on an outer circumference of the outer case, and the flexible tube may further include a bending portion extending from the corrugated portion and penetrating the hole.

The dust collecting device may be disposed on the outer case, and the bending portion may extend upward toward the dust collecting device.

A support portion surrounding a front of the hole may be provided to protrude from the outer case, and thus support a front of the bending unit when the inner case relatively moves with respect to the outer case.

A cutout portion may be provided in the inner case along a longitudinal direction to prevent interference with the bending portion when the inner case relatively moves with respect to the outer case.

The cleaning module may be provided to be relatively movable between a first state when a part of the cleaning module overlaps the cleaner main body and a second state when the cleaning module protrudes towards a front of the cleaner main body, and the inner case may be completely accommodated in the outer case in the first state.

According to another one embodiment of the present disclosure, a robot cleaner may include: a cleaner main body equipped with a dust collecting device; a cleaning module that is relatively movable with respect to the cleaner main body and cleans a floor; an outer case mounted on the cleaner main body; an inner case inserted into the outer case and provided to be relatively movable with respect to the outer case; a connector connected to the cleaning module and the inner case respectively; and a driving unit that relatively moves the inner case with respect to the outer case.

A guide groove may be provided to extend along a longitudinal direction in the outer case, and a guide rail may be provided to protrude from the inner case, the guide rail being inserted into the guide groove and guiding the relative movement of the inner case with respect to the outer case.

The driving unit may include: a driving motor including a worm mounted on a rotating shaft; a double gear in which a worm wheel engaged with the worm is combined with a pinion; and a rack gear provided on the guide rail extending along a longitudinal direction of the inner case and engaged with the pinion.

A driving motor mounting portion that fixes the driving motor may be provided in a front end portion of the outer case.

The cleaning module may be provided to be relatively movable between a first state when a part of the cleaning module overlaps the cleaner main body and a second state when the cleaning module protrudes towards a front of the cleaner main body, and the inner case may be completely accommodated in the outer case in the first state.

Advantageous Effect

According to the present disclosure, since a cleaning module is configured to protrude from a cleaner main body according to extension of a length of a connection unit, the cleaning module may enter an area of which height is less than that of the cleaner main body, for example, below a sofa, a bed, a table, or the like. As a result, a cleaning area of the robot cleaner may be enlarged.

MODES FOR CARRYING OUT THE PREFERRED EMBODIMENTS

Hereinafter, a robot cleaner according to the present disclosure will be described in detail with reference to the accompanying drawings.

A singular representation may include a plural representation unless it represents a definitely different meaning from the context.

In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1:
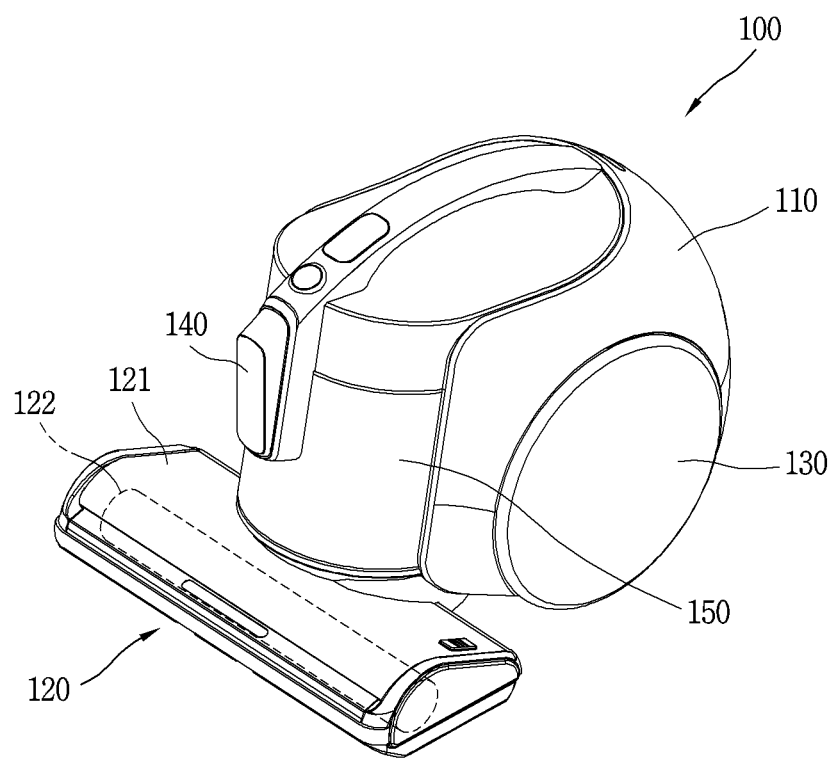
FIG. 1 is a perspective view illustrating one embodiment of a robot cleaner according to the present disclosure.
Figure 2:
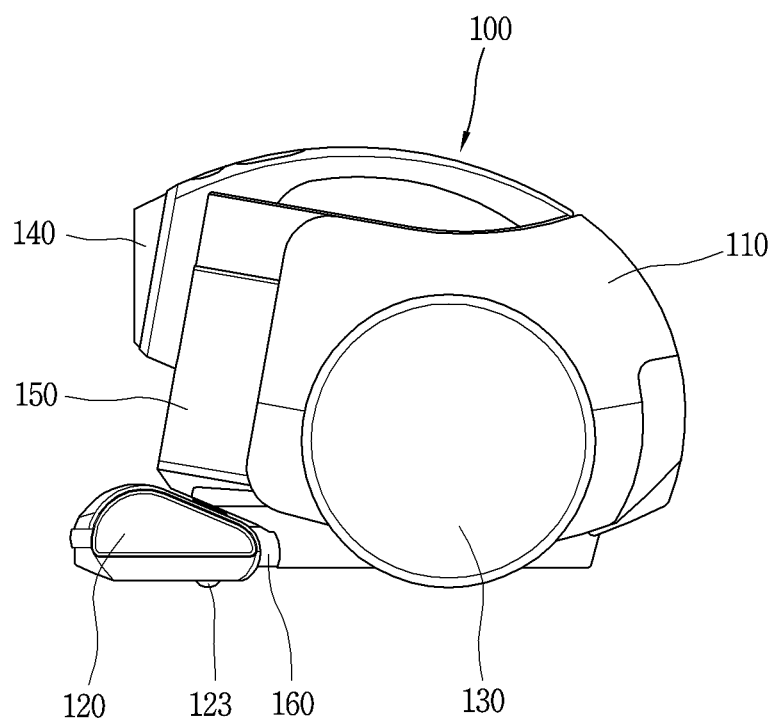
FIG. 2 is a lateral view of the robot cleaner of FIG. 1.

FIG. 1 is a perspective view illustrating one example of a cleaner 100 according to the present disclosure. FIG. 2 is a lateral view of the robot cleaner 100 of FIG. 1.

Referring to FIGS. 1 to 2, the robot cleaner 100 is configured to clean a floor while traveling in a predetermined area by itself. Cleaning the floor disclosed herein includes sucking dust and foreign materials on the floor or mopping the floor.

The robot cleaner 100 includes a cleaner main body 110 and a cleaning module 120.

The cleaner main body 110 is provided with various components in addition to a controller (not illustrated) for controlling the robot cleaner 100.

The cleaner main body 110 is provided with driving wheels 130 for autonomous traveling. The driving wheels 130 are rotatable by receiving driving force from a motor. A rotating direction of the motor may be controlled by the controller, and accordingly the driving wheels 130 may be rotatable in one direction or another direction.

The driving wheels 130 may be provided on both left and right sides of the cleaner main body 110, respectively. The cleaner main body 110 may be moved or rotated forward, backward, left or right by the driving wheel 130. Each of the driving wheels 130 may be configured to be driven independently of each other. To do so, each of the driving wheels 130 may be driven by a different motor.

The cleaner main body 110 may be provided with a sensing unit 140 for sensing a surrounding situation of the cleaner main body 110. The controller may sense an obstacle, detect a land feature, or generate a map of a travel area through the sensing unit 140.

The cleaning module 120 is configured to suck dust and foreign materials from a floor or to mop the floor.

When the cleaning module 120 is configured to suck dust and foreign substances on the floor, a housing 121 constituting appearance of the cleaning module 120 may be provided with an opening (not shown) for sucking air containing dust and foreign materials therethrough. The opening may be provided at a lower portion and arranged to face a bottom. The opening may communicate with a communication hole (not shown). The communication hole may be formed on an upper portion of the housing 121.

A brush 122 which is configured to sweep dust on a floor by virtue of rotation may be mounted on the opening. The brush 122 may be detachably coupled to the opening.

Dust and foreign substances in the air sucked through the cleaning module 120 are filtered and collected in a dust collecting device 150 mounted in the cleaner main body 110. Air separated from the dust and the foreign substances is discharged to outside of the cleaner main body 110. The cleaner main body 110 may be provided therein with an intake flow path (not illustrated) through which the air sucked by the cleaning module 120 is guided into the dust collecting device 150, and an exhaust flow path (not illustrated) through which air passed through the dust collecting device 150 is discharged to the outside of the cleaner main body 110.

The dust collecting device 150 may be provided with at least one of a filter (not shown) and a cyclone (not shown) for filtering the dust and foreign materials in the sucked air. For example, the dust collecting device 150 may include a first cyclone for filtering dust having a large particle and a second cyclone for filtering fine dust having a small particle that have passed through the first cyclone.

When the cleaning module 120 is configured to mop the floor, a mop (not illustrated) may be detachably attached to the housing 121. The mop may be attached to a lower surface of the housing 121 and configured to mop a floor in response to the movement of the robot cleaner 100. Alternatively, the mop may be mounted in the opening 121a in place of the brush 122. In this case, the mop is configured to be rotatable.

The cleaning module 120 may have both a function of sucking dust on the floor and a function of mopping the floor. The user may selectively attach or adhere the brush 122 or the mop to the housing 121 according to the cleaning purpose. Alternatively, the brush 122 and the mop module may be mounted together on the housing 121 to mop the floor after sucking the dust and foreign substances on the floor.

The cleaner module 120 may further include an auxiliary wheel 123. The auxiliary wheel 123 supports the cleaner main body 110 together with the driving wheel 130 and assists traveling of a cleaner by the driving wheel 130.

Figure 3:
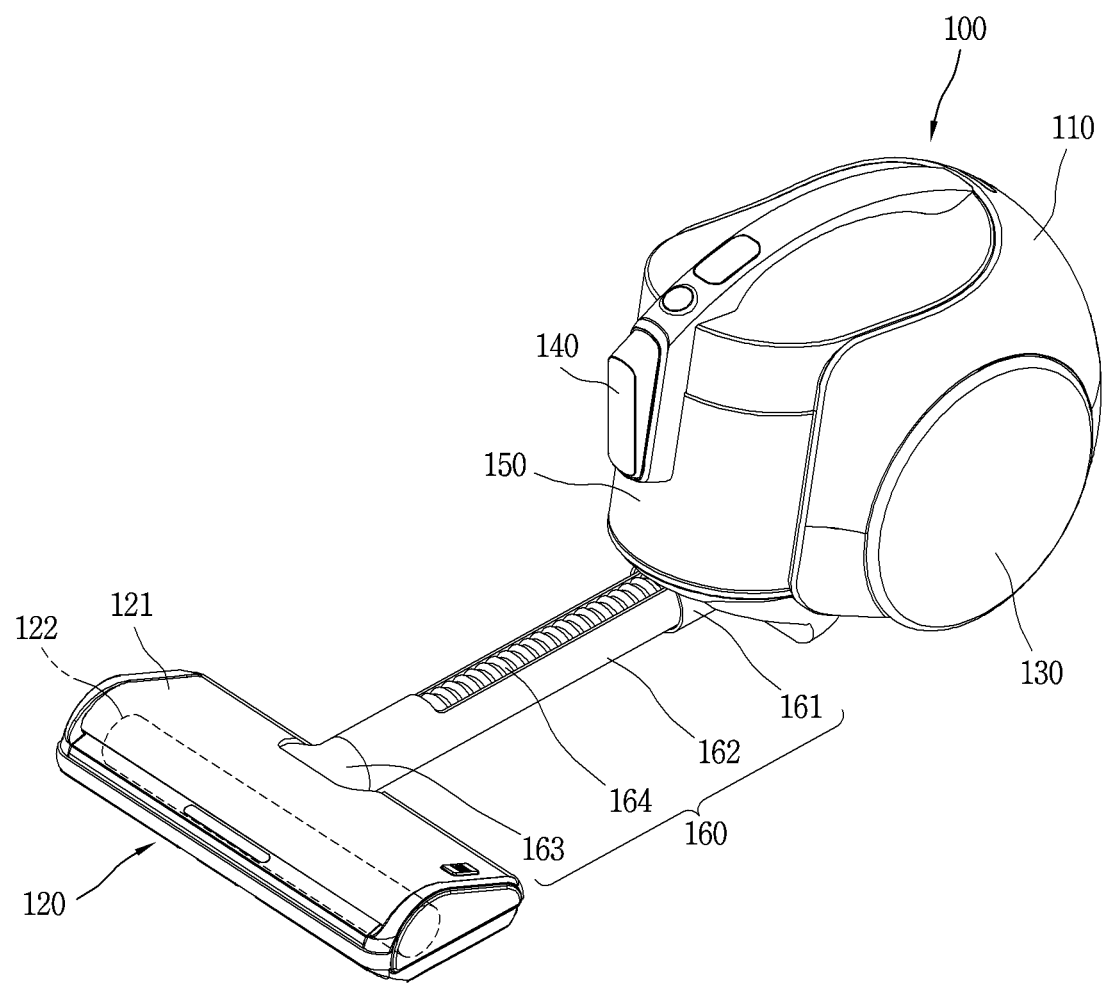
FIG. 3 is a conceptual view illustrating a state when the cleaning module of FIG. 1 protrudes toward a front of a cleaner main body.
Figure 4:
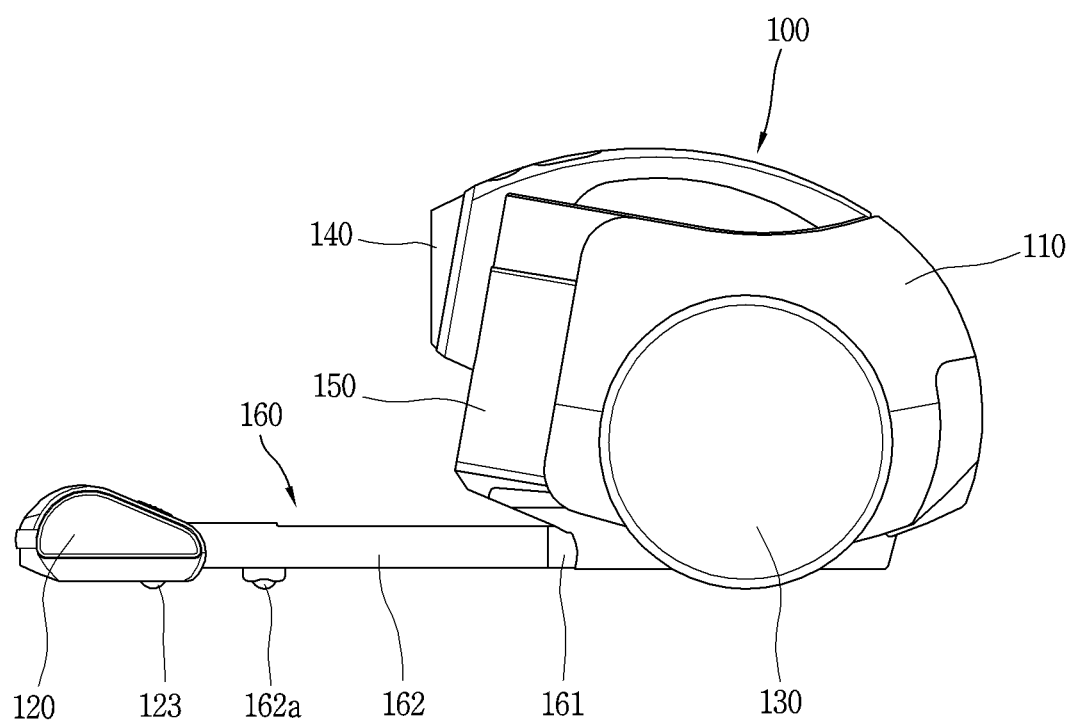
FIG. 4 is a lateral view of the robot cleaner of FIG. 3.

FIG. 3 is a conceptual view illustrating a state when the cleaning module 120 of FIG. 1 protrudes toward a front of the cleaner main body 110. FIG. 4 is a lateral view of the robot cleaner 100 shown in FIG. 3.

Referring to FIGS. 3 and 4 together with FIGS. 1 and 2, the cleaning module 120 is configured to be relatively movable with respect to the cleaner main body 110. In detail, the cleaning module 120 is configured to move away from the cleaner main body 110, or to move close to the cleaner main body 110 when the cleaning module 120 is far from the cleaner main body 110. The cleaning module 120 may be configured to protrude toward a front of the cleaner main body 110 corresponding to a direction in which the cleaner main body 110 moves forward.

FIGS. 1 and 2 illustrate a first state when the cleaning module 120 is disposed adjacent to the cleaner main body 110. FIGS. 3 and 4 illustrate a second state when the cleaning module 120 protrudes from the cleaner main body 110. The cleaning module 120 may be relatively movable with respect to the cleaner main body 110 between the first state and the second state, and may be fixed at any position between the first state and the second state. That is, an extent to which the cleaning module 120 protrudes from the cleaner main body 110 may be adjustable.

In the first state, a part of the cleaning module 120 may be arranged to overlap with the cleaner body 110 in a vertical direction.

A connection unit 160 is provided between the cleaner main body 110 and the cleaning module 120 to implement the relative movement of the cleaning module 120 with respect to the cleaner main body 110 as described above. The connection unit 160 is connected to the cleaner main body 110 and the cleaning module 120 respectively, and is configured to have a variable length.

That is, a length of the connection unit 160 is configured to be variable so that the cleaning module 120 moves relatively with respect to the cleaner main body 110. In detail, when a length of the connection unit 160 is reduced, when the cleaning module 120 is disposed adjacent to the cleaner main body 110 (the first state). When a length of the connection unit 160 is extended, the cleaning module 120 is disposed to protrude from the cleaner main body 110 (the second state).

Figure 5:
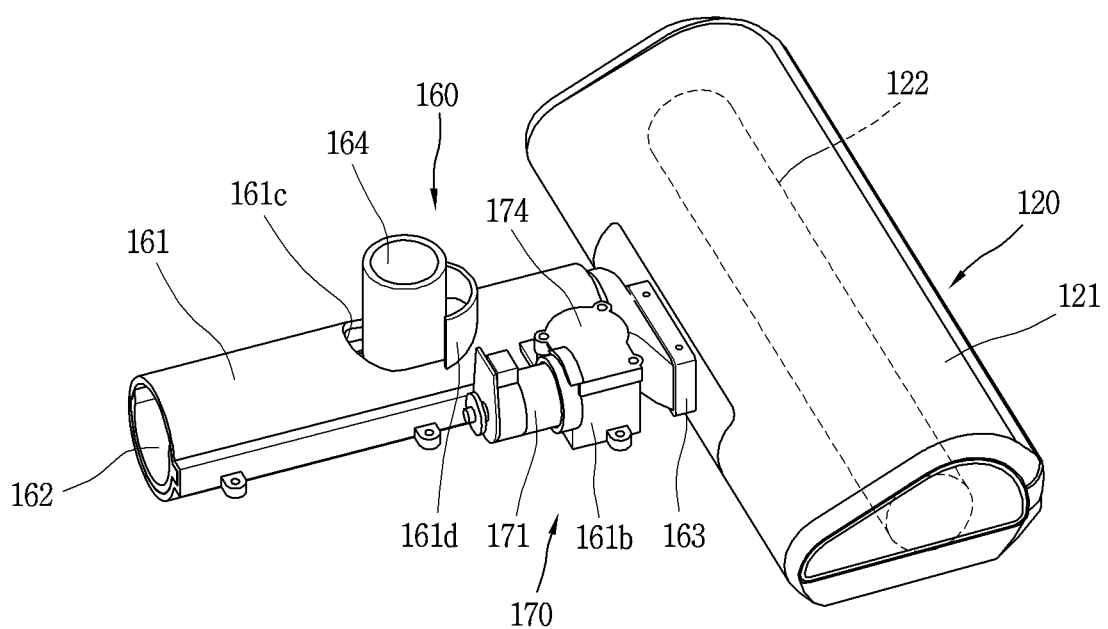
FIG. 5 is a conceptual view illustrating a structure in which the cleaning module of FIG. 3 is relatively movable with respect to the cleaner main body.
Figure 6:
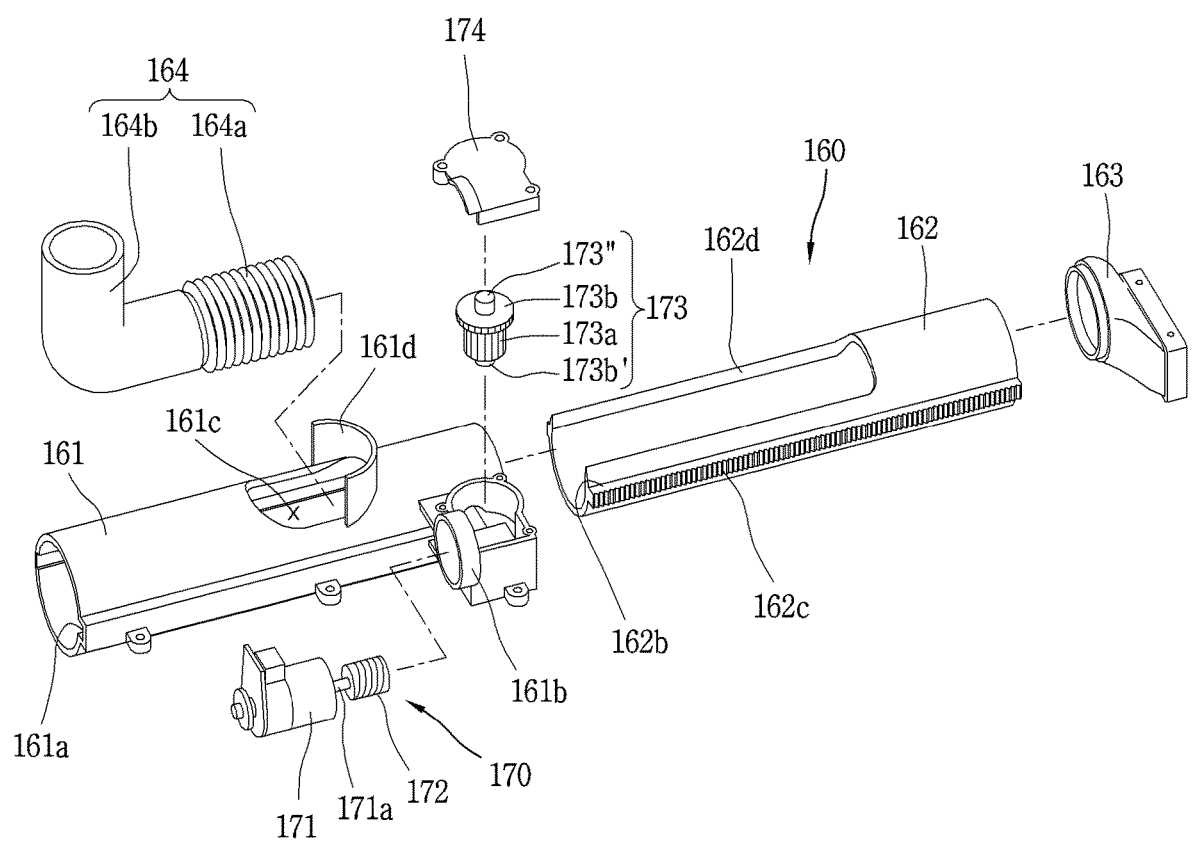
FIG. 6 is a conceptual view illustrating disassembly of components of the structure of FIG. 5.
Figure 7:
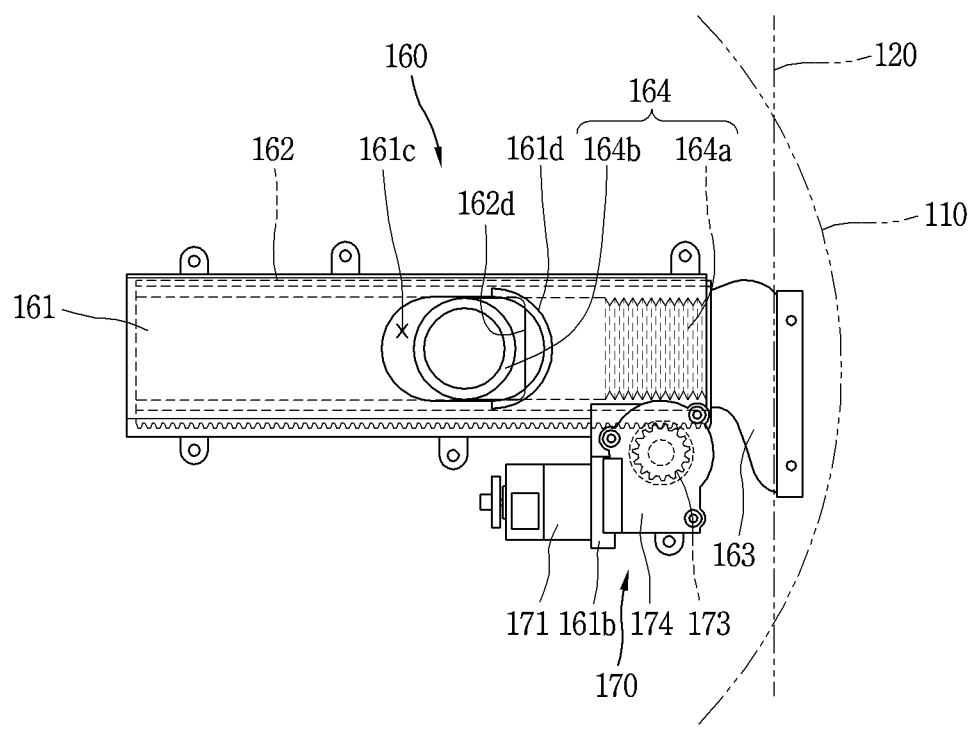
FIG. 7 is a conceptual view illustrating a structure in which the cleaning module is relatively movable with respect to the cleaner main body in a state of FIG. 1.
Figure 8:
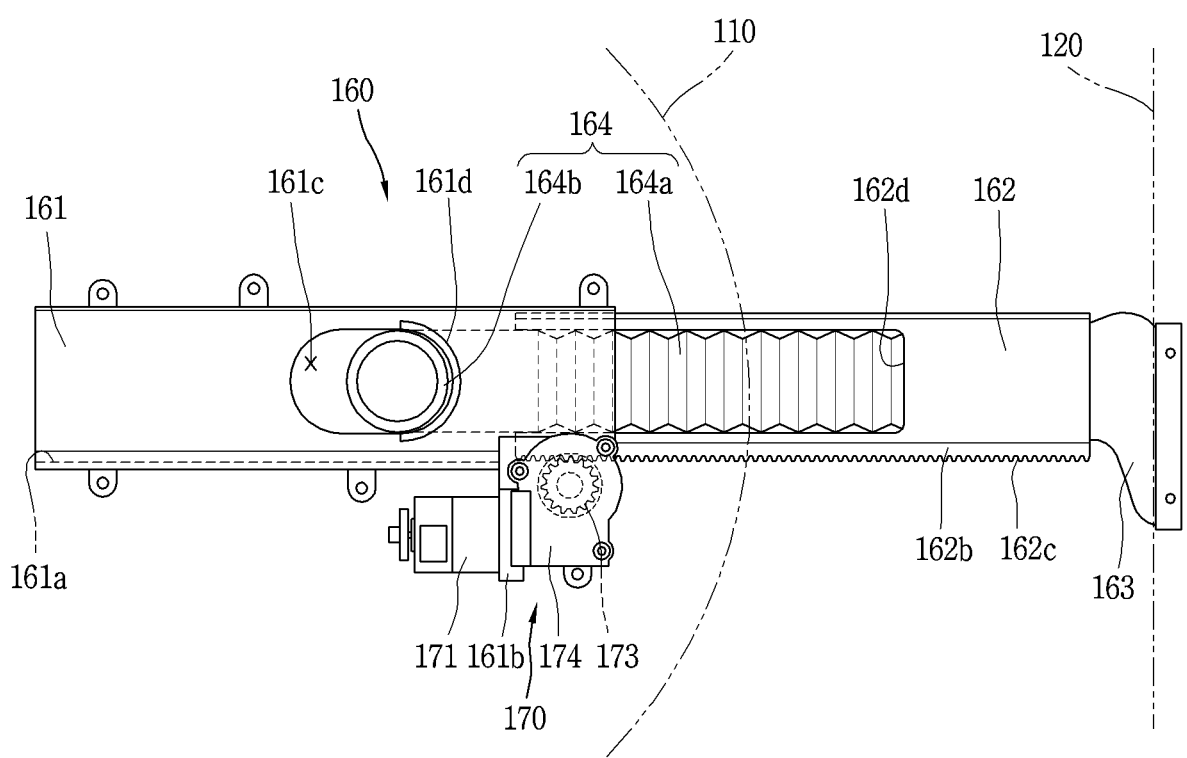
FIG. 8 is a conceptual view illustrating a structure in which the cleaning module is relatively movable with respect to the cleaner main body in the state of FIG. 3.

FIG. 5 is a conceptual view illustrating a structure in which the cleaning module 120 of FIG. 3 is relatively movable with respect to the cleaner main body 110. FIG. 6 is a conceptual view illustrating disassembly of components of the structure of FIG. 5. FIGS. 7 and 8 are conceptual views illustrating the structure in the state of FIGS. 1 and 3, respectively.

Referring to FIGS. 5 to 8, the connection unit 160 may include a plurality of members configured to be relatively movable. In detail, as one member is configured to be relatively movable with respect to a fixed member, extension and reduction of a length of the connection unit 160 may be implemented.

In the present embodiment, it is shown that the connection unit 160 includes an outer case 161 and an inner case 162. The outer case 161 and the inner case 162 are provided longitudinally in one direction. The inner case 162 may be accommodated in a hollow portion of the outer case 161.

The outer case 161 is mounted on the cleaner main body 110. A degree of draw-in or draw-out of the inner case 162 is adjusted when the inner case 162 is inserted into the outer case 161. Thus, the inner case 162 may be relatively movable with respect to the outer case 161.

The connection unit 160 may further include a connector 163 connected to the cleaning module 120 and the inner case 162 each.

The inner case 162 may be directly connected to the cleaning module 120. In this case, an end portion of the inner case 162 connected to the cleaning module 120 functions as a connector.

Referring back to FIG. 3, the cleaning unit 160 may be disposed below the cleaner main body 110. The dust collecting device 150 may be disposed on the connection unit 160.

As shown in FIG. 7, in the first state when the cleaning module 120 is disposed adjacent to the cleaner main body 110, the inner case 162 is accommodated in the outer case 161 at maximum. The inner case 162 may be completely accommodated inside an outer case 161.

On the other hand, as shown in FIG. 8, the inner case 162 is drawn out of the outer case 161 at maximum in the second state when the cleaning module 120 is disposed to protrude from the cleaner main body 110. Even in the second state, a part of the inner case 162 is accommodated in the outer case 161.

In the first state, the cleaner main body 110 may be arranged to cover a part of the cleaning module 120. As illustrated in FIG. 7, the connector 163 may be covered by the cleaner main body 110.

In the second state, the inner case 162 between the cleaner main body 110 and the cleaning module 120 may be exposed to outside. At this time, the connector 163 may also be exposed to outside.

A wheel 162a may be included on a lower part of the inner case 162. In the second state, the wheel 162a is disposed between the cleaner main body 110 and the cleaning module 120 to support the inner case 162.

In consideration of a structure in which the inner case 162 is relatively movable with respect to the outer case 161, a cutout portion (not shown) may be provided on a lower portion of the outer case 161 along a longitudinal direction so that the wheel 162a is not caught by the outer case 161.

The robot cleaner 100 includes a driving unit 170 that relatively moves the inner case 162 with respect to the outer case 161. In this drawing, a rack-and-pinion structure is shown as an example of the driving unit 170.

The connection unit 160 may include a guide structure for guiding relative movement of the inner case 162 with respect to the outer case 161 when the inner case 162 is relatively moved with respect to the outer case 161 by the driving unit 170. In this drawing, a rail structure is shown as an example of the guide structure.

Referring to the driving unit 170 and the guide structure in the present embodiment in detail, a guide groove 161a is provided in the outer case 161 to extend in a longitudinal direction, and a guide rail 162b is provided to protrude from the inner case 162, the guide groove 161a being inserted into the inner case 162 and guiding relative movement of the inner case 162 with respect to the outer case 161. Positions in which the guide groove 161a and the guide rail 162b are provided may be exchanged with each other and interchangeably arranged.

The driving unit 170 may include a driving motor 171, a double gear 173, and a rack gear 162c.

A worm 172 is mounted on a rotating shaft 171a of the driving motor 171. In a rack-and-pinion structure that is to be described later, the driving motor 171 may be disposed in a front end portion of the outer case 161 to maximize extension of a length of the inner case 162 with respect to the outer case 161. To do so, a driving motor mounting portion 161b for fixing the driving motor 171 and a double gear 173 that is to be described later may be provided in the front end portion of the outer case 161.

The driving motor 171 may be also fixed to a separate mechanism other than the outer case 161.

A rack gear 162c is formed on the guide rail 162b. The rack gear 162c is disposed longitudinally along an extending direction of the guide rail 162b.

A driving force generated by the driving motor 171 is transmitted to the rack gear 162c by the double gear 173 connected to the worm 172. The double gear 173 has a form in which a worm wheel 173a engaged with the worm 172 is combined with a pinion 173b.

The driving motor mounting portion 161b may receive the double gear 173, and one end 173' of a rotating shaft of the double gear 173 may be supported. The drive motor mounting portion 161b may be equipped with a cover member 174 provided to cover the double gear 173 and supporting another end 173" of the rotation shaft of the double gear 173.

The rotating shaft 171a of the drive motor 171 and the rotating shaft of the double gear 173 are arranged perpendicular to each other. The rotating shaft of the double gear 173 is disposed perpendicular to an extending direction of the rack gear 162c. Accordingly, the extending direction of the rack gear 162c corresponds to the rotating shaft 171a of the drive motor 171.

In this structure, when the drive motor 171 is driven, the double gear 173 rotates and the pinion 173b of the double gear 173 moves between both ends of the rack gear 162c. Since the pinion 173b of the double gear 173 is in a fixed state, the inner case 162 in which the rack gear 162c is provided moves according to rotation of the double gear 173. That is, the inner case 162 is relatively movable with respect to the fixed outer case 161.

The above-described structure is described an example of the driving unit 170 in the rack-and-pinion structure, but the present disclosure is not limited thereto. A design of the driving unit 170 may be variously changed.

For example, the driving unit 170 may include the driving motor 171, the pinion 173b, and the rack gear 162c. In this case, the pinion 173b is mounted on the rotating shaft 171a of the driving motor 171, and the pinion 173b is arranged to be engaged with the rack gear 162c. The rotating shaft 171a of the driving motor 171 may be disposed perpendicular to the extending direction of the rack gear 162c.

When the cleaning module 120 is configured to suck dust and foreign substances on the floor, the connection unit 160 may form an intake flow path for guiding a flow of air sucked by the cleaning module 120 to the dust collecting device 150. That is, the connection unit 160 not only relatively moves the cleaning module 120 with respect to the cleaner main body 110 as a length of the connection unit 160 varies, but also guides the air sucked by the cleaning module 120 to the dust collecting device 150.

To do so, a hollow portion is provided in the inner case 162, and the connection unit 160 may further include a flexible tube 164 accommodated in the hollow portion of the inner case 162. The flexible tube 164 is fixed to the outer case 161 and the inner case 162 each, and provided such that at least a part of the flexible tube 164 extends or contracts according to relative movement of the inner case 162 with respect to the outer case 161.

In the first state, the flexible tube 164 contracts at maximum, and in the second state, the flexible tube 164 extends to maximum. In the first state, a corrugated portion 164a of the flexible tube 164 that is to be described later may be completely accommodated in the inner case 162. In the second state, the corrugated portion 164a of the flexible tube 164 may be provided throughout an inside of the inner case 162 and an inside of the outer case 161.

In addition, the connector 163 described above and connected to the cleaning module 120 and the inner case 162 each is configured to supply air sucked by the cleaning module 120 to the inner case 162. To do so, the connector 163 has a hollow portion, and the hollow portion may communicate with a communication hole of the cleaning module 120 and a hollow portion of the inner case 162, respectively. In consideration of this function, the connector 163 may be referred to as a flow path connector 163.

The flexible tube 164 may include the corrugated portion 164a including a ductile material and provided to extend or contract in accordance with relative movement of the inner case 162. One end portion of the flexible tube 164 may be connected to the inner case 162 and the flow path connector 163.

A hole 161c communicating with inside of the outer case 161 may be provided in an outer circumference of the outer case 161. The hole 161c may have a form open toward an upper portion of the cleaner main body 110. In this drawing, the hole 161c is formed to have a slit shape. The hole 161c may have a size corresponding to an outer diameter of a bending portion 164b that is to be described later.

The flexible tube 164 may further include the bending portion 164b extending from the corrugated portion 164a and penetrating the hole 161c. One end of the bending portion 164b may be inserted into the outer case 161 and another end of the bending portion 164b may extend through the hole 161c. The one end of the bending portion 164b may be connected to the corrugated portion 164a. The another end of the bending portion 164b may extend upward toward the dust collecting device 150 disposed in an upper portion of the outer case 161.

When the inner case 162 is drawn out of the outer case 161, the bending portion 164b is locked by the outer case 161 (in detail, an inner circumferential surface of a front side of the hole 161c). That is, as the inner case 162 is drawn out of the outer case 161, the corrugated portion 164a gradually expands when the bending portion 164b is locked by the outer case 161.

A support portion 161d surrounding a front of the hole 161c may be provided to protrude from the outer case 161. The support portion 161d is configured to support a front of the bending portion 164b when the inner case 162 relatively moves with respect to the outer case 161. The support portion 161d may be provided to completely surround the hole 161c.

When the support portion 161d is not provided, the bending portion 164b is locked only in an inner circumferential surface of a front side of the hole 161c. In this process, since stress may be concentrated on a portion of the locking of the bending portion 164b, a possibility of damage to the bending portion 164b increases. However, in the above-described structure, there is such an advantage that the bending portion 164b is supported by the support portion 161d having a large area so that a risk of the damage may be reduced.

A cutout portion 162d may be provided along a longitudinal direction in the inner case 162 to prevent interference with the bending portion 164b when the inner case 162 relatively moves with respect to the outer case 161. In this drawing, it is shown that the cutout portion 162d is provided on an upper part of the inner case 162.

When the inner case 162 is drawn out of the outer case 161, the flexible tube 164 may be exposed to outside through the cutout portion 162d.

Figure 9:
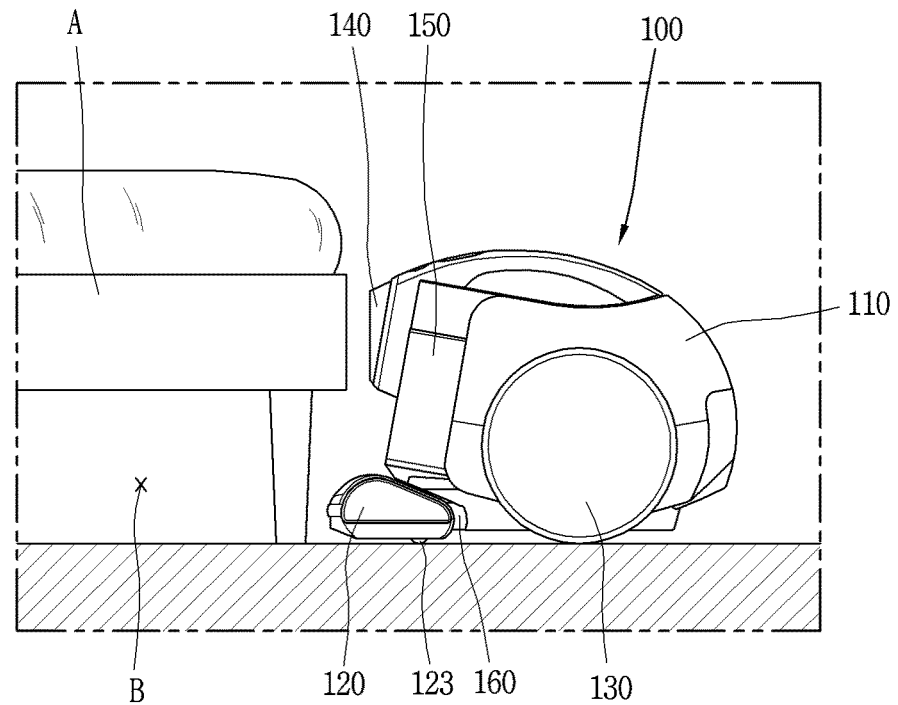
FIG. 9 is a conceptual view illustrating an example of using the robot cleaner of FIG. 1.
Figure 9:
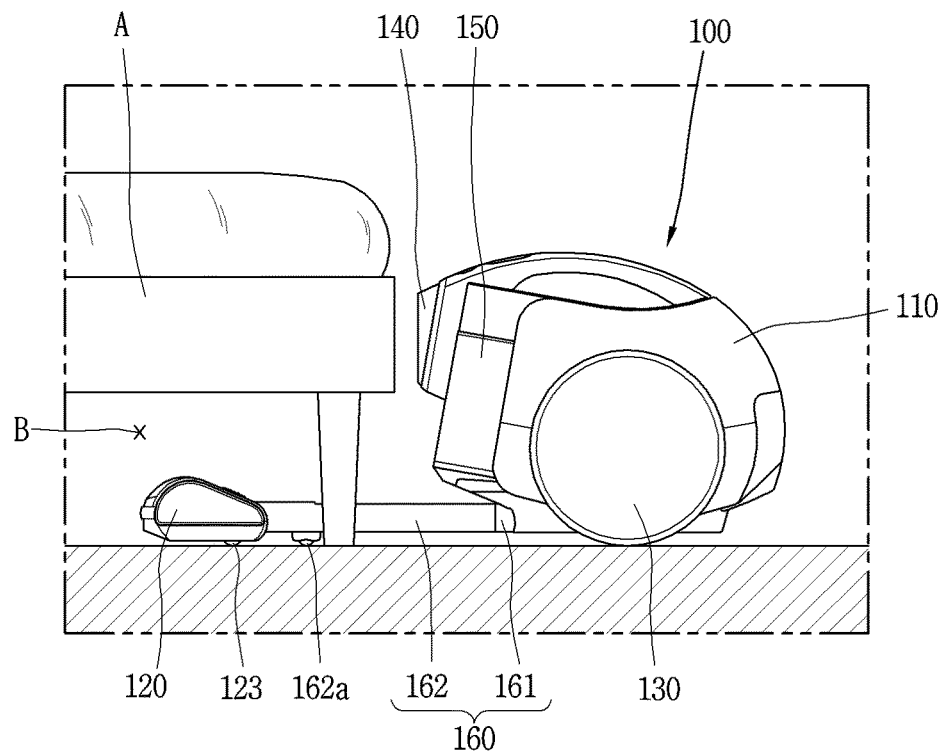

FIG. 9 is a conceptual view illustrating an example of using the robot cleaner 100 of FIG. 1.

Referring to FIG. 9, since the dust collecting device 150 is provided in the cleaner main body 110, the cleaner main body 110 is provided to have a height greater than that of the cleaning module 120. Therefore, the cleaner main body 110 may not enter an area B (e.g., under a sofa as shown in FIG. 9) of which a height is less than that of the cleaner main body 110.

However, in the present disclosure, since a length of the connection unit 160 extends and the cleaning module 120 protrudes from the cleaner main body 110, the cleaning module 120 may enter the area B and perform cleaning.

To do so, the controller may sense whether a length of the cleaning module 120 needs to extend, using the sensing unit 140. For example, the controller may obtain various information (a shape, a height, etc.) regarding an obstacle A in front of the cleaning main body 110 using the sensing unit 140, and thus sense whether the cleaning module 120 may enter the area B below the obstacle A even when the cleaning main body 110 may enter the area B.

As a result of the sensing, when a length of the cleaning module 120 needs to extend, a length of the connection unit 160 is extended so that the cleaning module 120 protrudes from the cleaner main body 110. For example, when the cleaning module 120 may enter the area B below the obstacle A, the driving motor 171 may be driven to draw the inner case 162 out of the outer case 161.

Therefore, the cleaning module 120 may enter the area B below the obstacle A that the cleaner main body 110 may not enter, and perform cleaning. When the cleaning of the area B below the obstacle A is finished, the controller may reduce a length of the connection unit 160 to arrange the cleaning module 120 adjacent to the cleaner main body 110.

As described above, according to the present disclosure, since the cleaning module 120 is configured to protrude from the cleaner main body 110 according to extension of a length of the connection unit 160, the cleaning module 120 may enter the area B of which a height is less than a height of the cleaner main body 110, such as below a sofa, a bed, a table, etc., and perform cleaning. As a result, a cleaning area of the robot cleaner 100 may be expanded.

The invention claimed is:

1. A robot cleaner comprising:
    a main body that receives a dust container and is coupled to a wheel that is selectively driven to move the main body;
    a cleaning head that receives air containing dust; and
    a connection housing that is connected to the main body and the cleaning head respectively and has a variable length such that the cleaning head is movable with respect to the main body,
    wherein the connection housing forms a part of a flow path that guides air between the cleaning head and the dust collector.

2. The robot cleaner of claim 1, wherein the cleaning head is configured to be relatively movable with respect to the main body between a first position where a part of the cleaning head overlaps the main body and a second position where the cleaning head is in front of the main body.

3. The robot cleaner of claim 1, wherein the connection housing includes:
    an outer case mounted on the main body;
    an inner case that is inserted into the outer case and is relatively movable with respect to the outer case; and
    a tube which is received in the outer case and coupled to the inner case respectively, at least a part of the tube extending or contracting according to the relative movement of the inner case.

4. The robot cleaner of claim 3, wherein the tube includes a corrugated portion including a ductile material and provided to extend or contract according to the relative movement of the inner case.

5. The robot cleaner of claim 4, wherein a hole extending to an interior of the outer case is provided on an outer circumference of the outer case, and
    the tube further an elbow extending from the corrugated portion and provided in the hole of the outer case.

6. The robot cleaner of claim 5, wherein the dust container is coupled to the outer case, and the elbow extends through the hole and upward toward the dust container.

7. The robot cleaner of claim 6, wherein further comprising:
a support protrusion provided at a front of the hole to protrude from the outer case and to support a front of the elbow when the inner case moves with respect to the outer case.

8. The robot cleaner of claim 5, wherein a cutout is provided in the inner case along a longitudinal direction to prevent interference with the elbow of the tube when the inner case moves with respect to the outer case.

9. The robot cleaner of claim 8, wherein the cleaning head is provided to be horizontally movable between a first position where a part of the cleaning head overlaps the cleaner main body and a second position where the cleaning is provided in front of the main body, and
the inner case is completely accommodated in the outer case when the cleaner head is at the first position.

10. The robot cleaner of claim 3, wherein the connection housing further includes a connector that is connected to the cleaning head and the inner case, and supplies the air received by the cleaning head to the inner case.

11. The robot cleaner of claim 10, wherein one end portion of the tube is connected to the inner case and the flow path connector.

12. The robot cleaner of claim 3, further comprising:
a guide groove that extends along a longitudinal direction in the outer case, and
a guide rail that protrudes from the inner case, the guide rail being configured to be inserted into the guide groove and to guide the relative movement of the inner case with respect to the outer case.

13. The robot cleaner of claim 12, further comprising a driving motor that that provides a force to more the inner case with respect to the outer case.

14. The robot cleaner of claim 13, wherein the comprises:
a driving motor includes a worm mounted on a rotating shaft and
wherein the robot cleaner further comprises:
a double gear that includes a worm wheel positioned to engage the worm of the driving motor, and a pinion positioned to engage the worm wheel; and
a rack gear provided on the guide rail extending along a longitudinal direction of the inner case and configured to engage the pinion.

15. The robot cleaner of claim 14, further comprising:
a driving motor mount that fixes the driving motor and the double gear and is provided on an end portion of the outer case.

* * * * *